United States Patent [19]

Baxter et al.

[11] Patent Number: 4,790,879
[45] Date of Patent: Dec. 13, 1988

[54] WATER-SOLUBLE TRIAZANE DYESTUFFS FREE FROM CELLULOSE REACTIVE GROUPS AND SUITABLE FOR USE IN INKS

[75] Inventors: Anthony G. W. Baxter, Manchester; Stephen B. Bostock, Bury; David Greenwood, Oldham, all of England

[73] Assignee: Canon Kabushiki Kaisha, Tokyo, Japan

[21] Appl. No.: 944,567

[22] Filed: Dec. 22, 1986

Related U.S. Application Data

[62] Division of Ser. No. 765,001, Aug. 12, 1985.

[30] Foreign Application Priority Data

Aug. 24, 1984 [GB] United Kingdom ............... 8421557

[51] Int. Cl.$^4$ .............................................. C09D 11/02
[52] U.S. Cl. ...................................... 106/22; 106/20
[58] Field of Search ................... 106/22, 20; 534/693, 534/701, 690, 712, 708, 709; 8/641

[56] References Cited

U.S. PATENT DOCUMENTS

| | | | |
|---|---|---|---|
| 2,643,996 | 6/1953 | Widmer et al. | 534/701 X |
| 3,110,710 | 11/1963 | Rattbe et al. | 534/701 X |
| 3,846,141 | 11/1974 | Ostergren et al. | 106/22 |
| 3,903,034 | 9/1975 | Zabiak et al. | 260/29.6 WB |
| 4,010,150 | 3/1977 | Tabei et al. | 534/701 |

FOREIGN PATENT DOCUMENTS

| | | |
|---|---|---|
| 1457767 | 12/1976 | United Kingdom . |
| 2035355 | 6/1980 | United Kingdom ............... 534/701 |

OTHER PUBLICATIONS

Derwent Abstract 41902C—(which corresponds to German patent EP 11873).

*Primary Examiner*—Amelia Burgess Yarbrough
*Attorney, Agent, or Firm*—Cushman, Darby & Cushman

[57] ABSTRACT

A water-soluble dye, free from cellulose reactive groups, of the formula:

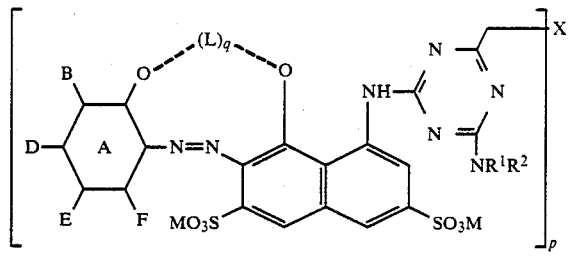

wherein
$R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ and $R^2$ together with the nitrogen atom form a morpholine ring
a and b are different and from 1 to 8
m is from 1 to 10;
n is from 0 to 9;
q is ½ or 1
p is 1 or 2
L is a transition metal capable of complexing with a dye
M is H, ammonium, or a monovalent metal;
B, D, F and E are H or substituents;
X is $NR^1R^2$, $NR^3R^4$, $-NR^3-Z-NR^4-$, $OR^3$, or the residue of a mono- or dis-azo chromophore comprising benzene, naphthalene or hetero-mono- or bi- cyclic diazo and coupling components, linked to the triazine nucleus through a primary or secondary amino linking group in which $R^3$ and $R^4$ are each independently H, alkyl or aryl; and
Z is a divalent linking group;

suitable for use in the preparation of a printing ink, especially for ink jet printing.

14 Claims, 1 Drawing Sheet

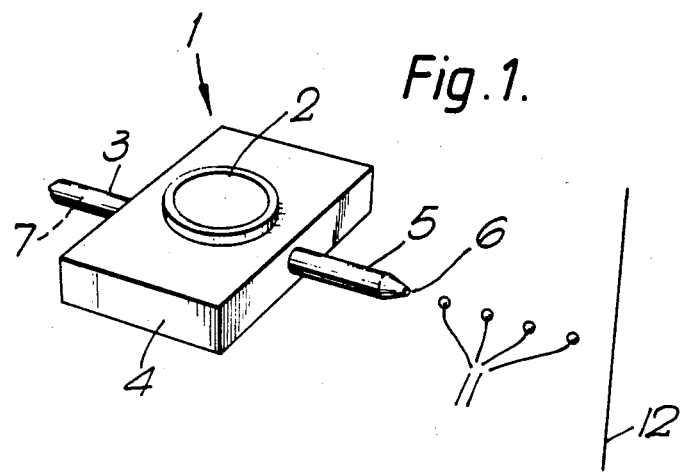
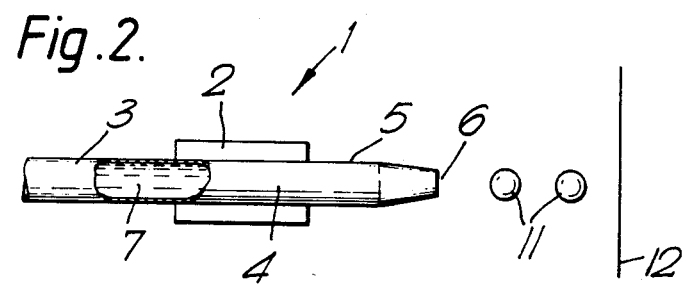
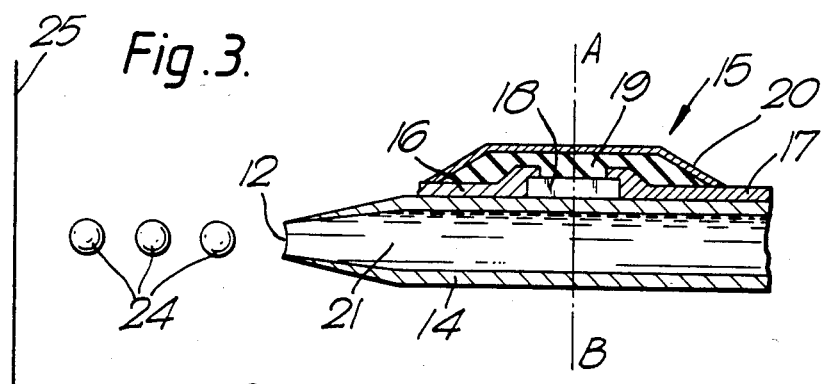
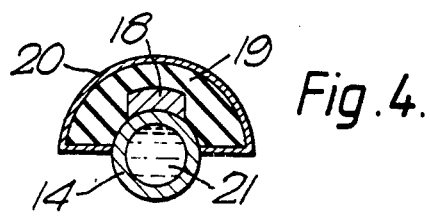

WATER-SOLUBLE TRIAZANE DYESTUFFS FREE FROM CELLULOSE REACTIVE GROUPS AND SUITABLE FOR USE IN INKS

This is a division of appliation Ser. No. 765,001 filed Aug. 12, 1985.

The specification describes an invention relating to a water-soluble dye and to an ink containing the dye which is suitable for use in ink jet printing.

According to the present invention there is provided a water-soluble dye, free from cellulose reactive groups, of the formula:

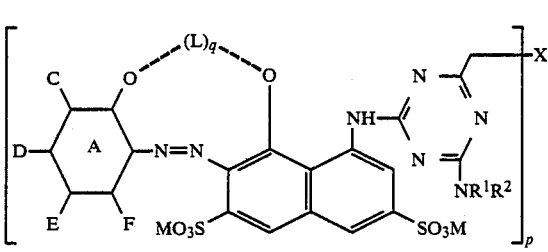

wherein $R^1$ is $—(C_aH_{2a}O)_m(C_bH_{2b}O)_nH$, $R^2$ is H or $—(C_aH_{2a}O)_m(C_bH_{2b}O)_nH$, or $R^1$ and $R^2$ together with the nitrogen atom form a morpholine ring a and b are different and from 1 to 8 m is from 1 to 10;

n is from 0 to 9;

q is ½ or 1 p is 1 or 2

L is a transition metal capable of complexing with a dye

M is H, ammonium, or a monovalent metal;

G, D, F and E are H or substituents;

X is $NR^1R^2$, $NR^3R^4$, $—NR^3—Z—NR^4—$, $OR^3$, or the residue of a mono- or dis-azo chromophore comprising benzene, naphthalene or hetero-mono- or bicyclic diazo and coupling components, linked to the triazine nucleus through a primary or secondary amino linking group in which $R^3$ and $R^4$ are each independently H, alkyl or aryl; and Z is a divalent linking group.

If the dye contains more than one $—(C_aH_{2a}O)_m(C_bH_{2b}O)_nH$ group these may be different, but are preferably identical. It is preferred that, in the group $NR^1R^2$, a and b are from 2 to 6 and more preferably 2 or 3, m is 1 or 2 and n is 0 or 1 or that $R^1$ and $R^2$ together with the nitrogen atom form a morpholine ring. Examples of groups represented by $R^1$ and $R^2$ are hydroxyethyl, 3-hydroxy-n-propyl, 6-hydroxy-n-hexyl and 3-(2-hydroxyethoxy)propyl. It especially preferred that $R^1$ is hydroxyethyl and $R^2$ is H; $R^1$ and $R^2$ are both hydroxyethyl or $NR^1R^2$ is morpholino.

L represents any suitable complexing transition metal but is preferably chromium, cobalt or copper or mixtures thereof, especially a 70:30 mixture of chromium and cobalt. Depending on the availability of electronic states in the metal, one atom of the metal may complex with one or two molecules of the dye, i.e. q may be 1 or ½. In the following structures a 1:2 metal:dye complex is indicated by the symbol $(L)_{\frac{1}{2}}$ for the metal portion.

The optional substituents, G, D, E and F, on Ring A may be any of those conventionally present in azo dyes, especially sulphonate groups or may be a substituted azo group. Examples of such substituents are $C_{1-4}$-alkyl, $C_{1-4}$-alkoxy, mono- or di-$C_{1-4}$-alkylamino, $C_{1-4}$-alkylcarbonylamino, unsubstituted and mono- and di-alkylamino-sulphonyl and carbonyl, ureido, phenylamino, nitro, halogen, especially chlorine, hydroxy, sulphonate, carboxylate. It is preferred that D is H or a substituted azo group, such as a phenylazo or naphthylazo group in which the phenyl and naphthyl radicals may carry substituents such as those given above for Ring A, especially 2,5-disulphophenylazo. It is also preferred that E is selected from nitro, $C_{1-4}$-alkyl, $C_{1-4}$-alkoxy, halogen and sulphonate and that B and F are both H.

The imino linking group in X may be of the general formula $—NR^5—$ in which $R^5$ is H, alkyl, preferably $C_{1-4}$-alkyl, or aryl, preferably phenyl, and it is preferred that $R^5$ is H or $CH_3$.

Where X is $NR^3R^4$, $R^3$ is preferably H or $C_{1-4}$-alkyl and $R^4$ is preferably H, $C_{1-4}$-alkyl, mono- or bi-cyclic aryl or mono- or bi-cycloheteroaryl. Where $R^4$ is mono- or bi-cyclic aryl, it is preferably a phenyl or naphthalene nucleus carrying at least one sulphonic acid group, $SO_3M$, and optionally carrying other substituents such as those exemplified above for Ring A.

Where X is $—NR^3—Z—NR^4—$, $R^3$ and $R^4$ are preferably the same and selected from H, $C_{1-4}$-alkyl and mono-cyclic aryl, especially phenyl or substituted phenyl, suitable substituents being those exemplified above for ring A, or $R^3$ and $R^4$ together with Z and the nitrogen atoms form a divalent heterocyclic radical, such as piperazine. The linking group Z is preferably alkylene, arylene or aralkylene which may be interrupted by heteroatoms, such oxygen, nitrogen and sulphur, which may themselves be part of groups, e.g. $—SO_2—$ and $—NR^3—$. Alternatively the linking group Z may be a divalent chromophore e.g. derived from a mono or bisazo or stilbene chromophore. Examples of Z are ethylene, hexamethylene, phen-1,4-ylene, $—SO_2CH_2—$, phen-1,4-ylenesulphonyl, $—(CH_2)_5O(CH_2)_5—$, 4-(eth-1,2-ylene)phen-1-yl, $—C_2H_4SO_2C_2H_4—$, diphen-4,4'-ylene, diphen-4,4'-ylenemethane, diphen-4,4'-ylene ether and 4,4'-diiminostilbene.

Where X is the residue of a mono- or dis-azo chromophore carrying a diazotisable amino group and comprising benzene, naphthalene or mono- or bi-cyclic heteroaryl diazo and coupling components, it is preferably the residue of a monoazo dye comprising benzene and naphthalene diazo and coupling components preferably carrying at least one sulphonic acid group, $SO_3M$, and optionally carrying other substituents such as those given above for Ring A.

Examples of groups represented by X are hydroxyethylimino, di(hydroxyethyl)amino, $NH_2$, $OCH_3$, $—NH—C_2H_4—NH—$, 3-sulpho-4-nitrophenylimino, 3-sulphophenylimino, 3,5-disulphophenylimino, and chromophores such as 5-hydroxy-6-(2-sulphophenylazo)-7-sulphonaphth-2-ylimino and 2,2'-disulpho-4,4'-diiminostilbene.

Water-solubility is enhanced by the presence of acid groups such as carboxylic acid and sulphonic acid groups and also by groups represented by $NR^1R^2$, especially where $R^1$ and/or $R^2$ are hydroxyethyl or $R^1$ and $R^2$ are morpholino. It is preferred that the dye carries at least three and more preferably at least four such water-solubilising groups. However, sulphonic acid groups are generally preferably to carboxylic acid groups and it is preferred that each azo chromophore attached to the triazine nucleus carries at least two, and more preferably at least three sulphonic acid groups, and that, where the dye contains two azo chromphores, the whole dye carries at least four and more preferably at least five sulphonic acid groups.

The species M, associated with the sulphonic acid groups, may be any monovalent cation which forms a stable, water-soluble salt with the dye and is preferably ammonium, including substituted ammonium, e.g mono, di, tri and quaternary alkylammonium and substituted alkylammonium, or an alkali metal, such as sodium, potassium or lithium.

Examples of specific dyes in accordance with the present invention are:

Dye 1: A dye of Formula I wherein $NR^1R^2$ is morpholino, $p=1$, L is 70:30 Cr/Co, $q=\frac{1}{2}$, M is sodium, X is $NH_2$, G, D and F are H and E is $NO_2$.

Dye 2: A dye of Formula I wherein $R^1$ is hydroxyethyl, $R^2$ is H, $p=1$, L is copper, $q=1$, M is potassium, G & F are H, D is 2,5-disulphophenylazo, E is methyl and X is 5-hydroxy-6-(2-sulphophenylazo)-7-sulphonaphth-2-ylimino, as K salt.

Dye 3: A dye of Formula I wherein $R^1$ is hydroxyethyl, $R^2$ is H, $p=1$, L is 70/30 Cr/Co, $q=\frac{1}{2}$, M is sodium, G, D and F are H, E is nitro and X is hydroxyethylamino.

Dye 4: A dye of Formula I wherein $R^1$, $R^2$, L, q, M, G, D, F and E are as in Dye 3, $p=2$ and X is —$NHCH_2CH_2NH$—.

Dye 5: A dye of Formula I wherein $R^1$, $R^2$, p, L, q, G, D, F and E are as in Dye 4, M is potassium and X is 2,2'-disulpho-4,4'-diiminostilbene as K salt.

Dye 6: A dye of Formula I wherein $R^1$, M, L, q, p, G, D, F and E are as in Dye 3, $R^2$ is hydroxyethyl and X is $NH_2$.

Dye 7: A dye of Formula I wherein $R^1$, $R^2$, L, q, p, M, G, D, E and F are as in Dye 3 and X is 3-sulphophenylimino, as Na salt.

Dye 8: A dye of Formula I wherein $R^1$, $R^2$, L, q, p, M, G, D, E and F are as in Dye 3 and X is 2-(3-sulpho-4-nitrophenyl)ethylimino, as Na salt.

Dye 9: A dye of Formula I wherein $R^1$, $R^2$, L, q, p, M, G, D, E and F are as in Dye 3, and X is 3,5-disulphophenylimino (Na salt).

Dye 10: A dye of Formula I wherein $R^1$, $R^2$, L, q, p, M, G, D and F are as in Dye 2, E is $OCH_3$ and X is 3-ureido-4-(2,5-dimethyl-4-[2,5-disulphophenylazo]-phenylazo)-3-ureidophenylimino, as K salt.

Dye 11: A dye of Formula I wherein $R^1$ is 3-hydroxypropyl, E is $C_2H_5$ and $R^2$, L, q, p, M, D, F and X are as in Dye 10.

Dye 12: A dye of Formula I wherein $NR^1R^2$ is morpholino, E is chloro, X is 3-(1-[4-sulphophenyl]-3-carboxypyrazolin-5-on-4-yl)-4-sulphophenylimino and L, p, q, M, D and F are as in Dye 11.

Dye 13: A dye of Formula I wherein $R^1$, $R^2$, L, p, q, M, X, E and F are as in Dye 2 and D is 3,6,7-trisulphonaphth-2-ylazo.

Dye 14: A dye of Formula I wherein $R^1$, $R^2$, L, p, q, M, E and F are as in Dye 2, D is 2-carboxy-4-sulphophenylazo and X is $OCH_3$.

Dye 15: A dye of Formula I wherein $R^1$, $R^2$, L, p, q, M, X, E and F are as in Dye 2 and D is 2-hydroxy-5-sulphophenylazo.

Dye 16: A dye of Formula I wherein $R^1$ is 3-(2-hydroxyethoxy)propyl, $R^2$, L, p, q, M, X, E and F are as in Dye 2 and D is 4-chloro-2,5-disulphophenylazo.

The dye of Formula I may be prepared by reaction of cyanuric chloride with the free amino group on the H acid of an metallised alkaline coupled H acid mono- or dis-azo chromophore and reacting the two remaining chlorine atoms of the cyanuric chloride moiety with an amine, $NHR^1R^2$, or sequentially with an alcohol, $R^3OH$, an amine, $NHR^3R^4$ ($p=1$), or a diamine, $NHR^3ZNHR^4$ ($p=2$), and then with an amine $NHR^1R^2$.

The invention with respect to the dye is further illustrated by the following examples in which all parts and percentages are by weight unless otherwise indicated.

EXAMPLE 1

A solution of 20.3 g of the dyestuff (0.01M) of Formula A:

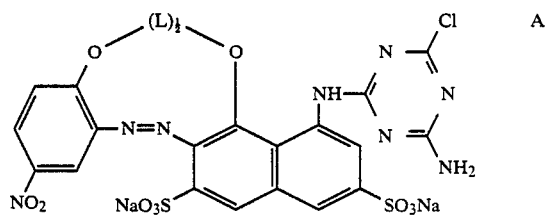

wherein L is chromium and cobalt in the ratio 70:30, in 300 g water at pH 7–8 and 75°–80° C. was prepared. A solution of 7.0 g of morpholine dissolved in 100 g water was added and the mixture held at 75°–80° C. for 12 hours. The solution was cooled to room temperature and 100 g salt added. The product was collected by filtration, washed with 20% sodium chloride and the paste redissolved in 300 g distilled water. The inorganic compounds were removed by dialysis and the resulting solution evaporated to dryness at 60° C. in vacuum and the dye finally dried at 40° C. for 18 hours. The dye has the same structure as Dye 1, i.e. the dye of Formula I in which $NR^1R^2$ is morpholino, $p=1$, L is 70:30 Cr/Co, $q=\frac{1}{2}$, M is sodium, X is $NH_2$, G, D and F are H and E is $NO_2$.

EXAMPLE 2

Stage 1

A solution was prepared by mixing 25.3 g aniline-2,5-disulphonic acid (0.1M) with 125 g water and sufficient of a 32% aqueous solution of sodium hydroxide to give a neutral solution. The mixture was then stirred with 7.25 g sodium nitrite and the resultant solution added to 20 g 36% hydrochloric acid and 50 g ice over 10 minutes with suitable agitation. The resultant suspension was held at 15°–20° C. for 15 minutes after which 10% sulphamic acid solution was added to remove excess nitrous acid and 20% sodium carbonate solution to raise the pH to 4.0–4.5.

A solution of 13.7 g cresidine (0.1M) in 50 g water and 8.7 g 36% hydrochloric acid (8.7 parts) was prepared at 60° C. The solution wass added slowly to a mixture of 125 g water, 20 g sodium acetate and 40 g ice at <10° C.

The diazo compound prepared above was added to the suspension of cresidine over 15 minutes at <10° C. The suspension was stirred 18 hours and the product collected by filtration, washed with saturated sodium chloride solution and dried at 40° C. to give 85 g of the amino-azo dye 2-methoxy-4-(2,5-disulphophenylazo)-5-methylaniline (0.092 moles, yield 92.15%).

Stage 2

A solution of 92.3 g of the amino-azo dye prepared in Stage 1 (0.1M) in 250 g water at pH 7.5-8.0 was prepared and 52.5 g 2N sodium nitrite solution (0.105M) was added. This solution was added to 50 g 36% hydrochloric acid and 250 g ice over 15 minutes at 0°-5° C. and the mixture stirred for 15 minutes after which excess nitrous acid was removed by the addition of 10% sulphamic acid solution.

The solution of the diazotised amino-azo dye was then added, at <10° C., over 20 minutes to a solution of 36.1 g acetyl-H-acid (0.11M) in 300 g water. At the same time 170 g of 8% sodium hydroxide solution was added dropwise to the reaction to maintain the pH value at 7.5-8.5. The coupling mixture was stirred 1 hour at 0°-5° C. after which 310 g salt was added, followed by 36% hydrochloric acid to maintain a pH of 2.0 and to precipitate the product. The disazo dye was collected by filtration, washed with a 25% sodium chloride solution and dried. The dry product was added to 1000 g 8% sodium hydroxide solution and the mixture heated to 70°-80° C. for 6 hours. The solution was cooled to 40° C., 36% hydrochloric acid added to a pH value of 7.0 followed by 250 g salt (25% w/v) to precipitate the dye. This was collected by filtration and washed with 25% sodium chloride solution. The 381 g filter paste contained 62.5 g of the disazo dye 2-(2-methoxy 4-[2,5-disulphophenylazo]-5-methylphenylazo)-3,5-disulpho-8-aminonaphth-1-ol (0.089 moles, yield=76.5%).

Stage 3

The disazo dye prepared in Stage 2 (37 g, 0.03M) was added to a solution of copper sulphate (15.6 g $CuSO_4.5H_2O$) and diethanolamine (2.46 g) in water (250 cm$^3$). The mixture was heated to reflux, 100° C., for 18 hours, cooled to room temperature and screened to remove insoluble material. Potassium chloride (20%, 60 g) was added at pH 5.5 and the precipitated product collected by filtration and washed with 20% potassium chloride solution.

The dyestuff paste thus obtained was added to 4% sodium hydroxide solution (150 cm$^3$) and the mixture heated to 80°-90° C. for 1 hour. The solution was screened at 60° C. and then hydrochloric acid (12 cm$^3$) added at room temperature to pH 4.0. Potassium chloride (20%, 50 g) was added and the precipitated product collected by filtration and washed with 20% potassium chloride solution to give a metallised disazo dye (50 g, 0.016M) of the formula:

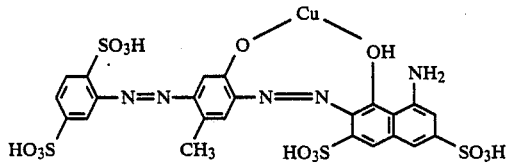
B

Stage 4

To a solution of the metallised disazo dye of Formula B (0.01M) in 100 g water at 0°-2° C. was added evenly a solution of 3.7 g cyanuric chloride in 30 g acetone with rapid agitation. The pH was maintained at 5-6 by the addition of 8% sodium hydroxide solution and the reaction was complete in 1 hour. The solution was screened and a neutral solution of 2.39 g J-Acid (0.01M) in 100 g water was added. This solution was warmed to 35° C. over 1 hour and this temperature maintained a further 1 hour. At the same time a pH value of 6.0-6.5 was maintained by the addition of 8% sodium hydroxide solution. The reaction was tested for completion by thin-layer chromatography.

To the solution was added 6 g ethanolamine and this was then heated to 50°-55° C. for 7 hours. The reaction mixture was cooled to room temperature and 150 g salt (25% w/v) added to precipitate the dye. The product was collected by filtration and washed with 25% sodium chloride solution to give a paste containing the dye of Formula I wherein $R^1$ is hydroxyethyl, $R^2$ is H, G and F are H, E is $CH_3$, M is Na, L is Cu, q=1, p=1, D is 2,5-disulphophenylazo and X is 5-hydroxy-7-sulphonaphth-2-ylimino.

Stage 5

A solution of 1.73 g orthanilic acid (0.01M) in 100 g water at pH 8.0 was prepared, using 8% sodium hydroxide solution. To this solution was added 5.25 g of 2N sodium nitrite solution and the whole cooled to 0°-5° C. To this was then added 5 g of 36% hydrochloric acid and excess nitrous acid maintained for 30 minutes at 0°-5° C. Excess nitrous acid was then removed by the addition of 10% sulphamic acid.

A solution containing 0.01M of the dye produced in Stage 4 above in 125 g water was prepared and cooled to 0°-5° C. The diazotised orthanilic acid solution described above was added over 15 minutes at 0°-5° C. and the pH maintained at 7.5-8.5 by the addition of 20 g 8% sodium hydroxide solution. The solution was stirred to room temperature and 46 g anhydrous potassium acetate added and dissolved on further agitation. The dye was then precipitated by the addition of 370 g ethanol over 30 minutes. The dye was collected by filtration, washed with 160 g ethanol/water (3:1 v/v) and then 160 g ethanol. After drying at 40° C., the solid was redissolved in 115 g distilled water and subjected to dialysis. The resulting solution, free from inorganic compounds, was evaporated to dryness at 50°-60° C. in vacuum to yield the dye hereinbefore identified as Dye 2, i.e. the dye of Formula I wherein $R^1$ is hydroxyethyl, $R^2$ and F are H, E is $CH_3$, M is K, L is Cu, q=1, p=1, D is 2,5-disulphophenylazo and X is 5-hydroxy-6-(2-sulphophenylazo)-7-sulphonaphth-2-ylimino.

EXAMPLE 3

A solution of 20.4 g of the dye of Formula C (0.01M) in 300 g

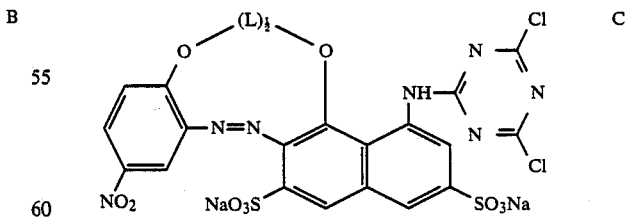
C wherein L is chromium and cobalt in the ratio 70:30, in 300 g water at pH 7-8 and adding a solution of 6.1 g ethanolamine in 30 g water. The solution was stirred at 35°-40° C. for 8 hours and then at 65°-70° C. for a further 12 hours. It was then cooled to room temperature and sodium chloride added to a concentration of 20%. The precipitate was collected by filtration and washed with a little 20% sodium chloride solution. The washed paste was redissolved in 300 g distilled water and inorganic material was removed by dialysis. The resulting solution of dye was evaporated to dryness at 50° C. under vacuum and finally dried at 80° C. under vacuum for 20 hours. The product was 12.2 g of Dye 3, i.e. the dye of Formula I wherein $R^1$ is hydroxyethyl, $R^2$ is H, p=1, L is 70/30 Cr/Co, q=½, M is sodium, G, D and F are H, E is nitro and X is hydroxyethylamino.

EXAMPLE 4

To a solution of the dye of Formula E (0.01M; 21.2 g), in water (300 g) at pH 7.0 and 35°–40° C. was added ethylenediamine (1.2 g). After 8 hours a further aliquot of the dye of Formula E (21.2 g), in water (300 g) at pH 7 was added. The pH was maintained at pH 6–7 by the addition of 2M sodium hydroxide solution and the temperature at 35°–40° C. for 20 hours. At the end of this time, ethanolamine (12 g) was added and the mixture stirred at 70°–80° C. for 12 hours.

After cooling to room temperature, salt (20% w/v) was added and the product filtered off. The paste was washed with brine (20% w/v; 300 g) and pulled dry.

The resulting paste was dissolved in the minimum of water at pH 7.5 and subjected to dialysis. The resulting solution, free from inorganic compounds, was evaporated to dryness at 50°–60° C. in vacuum, to yield the dye hereinbefore identified as Dye 4, i.e. the dye of Formula I, wherein $R^1$ is hydroxyethyl; $R^2$ is H; p is 2; L is 70/30 Cr/Co; q=½; M is sodium; G, D and F are H; E is nitro and X is 1,2-diiminoethane.

EXAMPLE 5

Using the same process and reaction conditions as in Example 4 except for the replacement of ethylenediamine by the equivalent weight of 4,4'-diaminostilbene-2,2'-disulphonic acid, the dye hereinbefore identified as Dye 5 was prepared, i.e. the dye of Formula I wherein $R^1$, $R^2$, H, p, q, L, M, G, D, F and E are as in Example 4 and x is 2,2'-disulpho-4,4'-diiminostilbene.

EXAMPLE 6

Using the same process and reaction conditions as in Example 1 except for the replacement of morpholine by the equivalent quantity of di(2-hydroxyethyl)amine, the dye hereinbefore identified as Dye 6 was prepared, i.e. the dye of Formula I wherein $R^1$ and $R^2$ are hydroxyethyl; and p, L, q, M, X, G, D, F and E are as in Example 1.

EXAMPLE 7

To a solution of the dye of Formula E (0.02M; 42.5 g) in water (300 g) at pH 5–6 and 35°–40° C. was added a solution of metanilic acid (7.7 g) in water (100 ml) at pH 7. The pH was maintained at 5–6 for 18 hours by the addition of 2M sodium hydroxide solution. To the resulting solution was added ethanolamine (24.4 g) in water (100 g) and this solution heated to 70°–80° C. for 12 hours.

After cooling to room temperature, salt (20% w/v) was added and the product filtered off. The resulting paste was washed with brine (20% w/v; 300 g) and pulled dry. The paste was dissolved in the minimum of water at pH 7.5 and subjected to dialysis. The resulting solution, free from inorganic compounds, was evaporated to dryness at 50°–60° C. in vacuum to yield the dye hereinbefore identified as Dye 7, i.e. the dye of formula 1 wherein $R^1$ is hydroxyethyl; $R^2$ is H; X is 3-sulphophenylimino and p, L, q, M, D, G, F and E are as in Example 1.

EXAMPLE 8

Using the same process and reaction conditions as in Example 7 except for the replacement of metanilic acid by the equivalent quantity of 2-nitro-5-(2-aminoethyleneimino)benzene sulphonic acid, the dye hereinbefore identified as Dye 8 and prepared, i.e. the dye of Formula I wherein X is 2-(3-sulpho-4-nitrophenylimino)-ethyleneimino and $R^1$, $R^2$, p, L, q, M, D, G, F and E are as in Example 1.

EXAMPLE 9

Using the same process and reaction conditions as in Example 7 except for the replacement of the metanilic acid by the equivalent quantity of 3,5-disulphoaniline, the dye hereinbefore identified as Dye 9 was prepared, i.e. the dye of Formula I wherein X is 3,5-disulphophenylimino and $R^1$, $R^2$, p, L, q, M, D, G, F and E are as in Example 1.

EXAMPLE 10

To a solution of the dye formed as in stage 3 of Example 2 (0.05M) in water (100 g) at 0°–5° C. and pH 6, was added a solution of cyanuric chloride (9.2 g) in acetone (75 g), with vigorous agitation. The pH was held at 6 by the addition of 1M sodium hydroxide solution. After 4 hours a solution of the dye, 4-(2,5-dimethyl-4-(2,5-disulphophen-1-ylazo)-phen-1-ylazo)-3-ureidophen-1-ylamine (0.05M) in water (600 g) at pH 7 was added. The resulting solution was stirred for 18 hours at pH 6–6.5 and 40°–45° C.

To the resulting solution was added ethanolamine (40 g) and the solution stirred at 70° C. for 7 hours. After cooling to room temperature, potassium acetate (20% w/v) was added followed by ethanol (1500 g). The product was filtered off and then re-slurried in ethanol (1500 g). After filtering off the product, it was dissolved in the minimum of water and subjected to dialysis. The resulting solution, free from inorganic compounds, was evaporated to dryness at 50°–60° C. in vacuum to yield the dye hereinbefore identified as Dye 10, i.e. the dye of formula I wherein $R^1$ is hydroxyethyl; $R^2$, G and F are H; E is $CH_3$; M is K; L is Cu; q=1; p=1; D is 2,5-disulphophenyl and X is 4-(2,5-dimethyl-4-[2,5-disulphophen-1-ylazo]-phen-1-ylazo)-3-ureidophen-1-ylamino.

The dyes of Formulae A, B and C may be prepared using methods previously described in, e.g. UK No. 870,985 (Ciba), UK No. 952,461 (Sandoz) and UK No. 985,481 (ICI).

Ink

The aforementioned water-soluble dyes of the present invention are adapted for use in inks, particularly writing and printing inks based upon water and/or water-miscible organic solvents, such as alkanols and glycols, and especially inks suitable for ink-jet printing wherein the ink is ejected from an orifice of a recording head in the form of liquid droplets.

For recording on paper or the like with writing tools (fountain pen, felt pen, etc.), it is conventional to use inks which are solutions of dyes in water or a water miscible organic solvent and inks of similar composition are also used in ink-jet printing.

In ink-jet printing, droplets of ink are generated in various ways and deposited on a substrate to effect a record. Suitable inks comprise, as essential components, a recording agent (usually a dye or a pigment) and a liquid vehicle (usually water, an organic solvent or mixtures thereof) and, as optional components, various other additives.

Ink-jet printing may be classified into various systems depending on the method for generation of ink droplets and the method for controlling the flight direction of ink droplets. An example of a device in accordance with one system is shown in FIG. 1.

The device shown in FIG. 1 operates by providing a printing signal at the print head section having a piezo-electric oscillator and generating ink droplets corresponding to said signal. In FIG. 1 a print head 1, comprises a piezo-oscillator 2, an inlet line 3 for ink, a liquid chamber 4, and an outlet line 5 leading to a nozzle 6 directed at a substrate 12. Ink 7 is introduced into the liquid chamber 4, through inlet 3 and fills the chamber 4 and the outlet line up to the nozzle 6. A pulsed electrical signal derived from a pattern information signal is applied to the piezo-electric oscillator 2 which transforms the pulsed electrical signal into pressure pulses and applies these to the ink 7 in the liquid chamber 4. As a result, the ink 7 is discharged as droplets 11 through the nozzle 6 thereby to effect recording on the surface of the substrate 12.

An example of another type of device using the same system is shown in FIG. 2, in which a tubular liquid chamber 4 links the inlet and outlet lines 3, 5 and a cylindrical piezoelectric oscillator 2 is arranged around the outer peripheral portion of the chamber 4. The mechanism for generation of ink droplets is essentially the same as in the device as shown in FIG. 1.

In another system, charged droplets are continuously generated but only a proportion of the droplets are selected for recording.

In yet another system, heat energy corresponding to the pattern information signal is imparted to the ink in the chamber of print head, and liquid droplets are formed by said energy. An embodiment of such a device is shown in FIGS. 3 and 4. FIG. 3 is a cross-sectional view along the length of a tube 14 in a print head 13 and FIG. 4 is a cross-sectional view taken on the line A-B in FIG. 3.

In FIGS. 3 and 4 a print head 13, for heat sensitive recording by the deposit of droplets 24 of ink 21 on a substrate 25, comprises a thin-walled tube 14 terminating at a nozzle 12 carrying a heat generator 15. The heat generator 15 comprises a pair of spaced aluminium electrodes 16, 17, defining a gap occupied by a nichrome heating resistor 18 the ends of the electrodes 16, 17 and the resistor 18 being encased in a layer of insulant 19 and a protective envelope 20.

In operation an ink 21 is fed into the right hand end of the tube 14 under slight pressure and forms a meniscus at the nozzle 12.

The application of a pulsed electric signal, derived from a pattern information signal, across the electrodes 16, 17, generates pulses of heat in the resistor 18 which are transferred across the wall of the tube and cause the formation of bubbles in the ink 21 adjacent to the resistor 18. The excess pressure developed by the bubbles causes discharge of the ink 21 from the nozzle 12 in the form of small droplets 24, each corresponding to a electric pulse, directed at the substrate 25.

As ink-jet printing generates little noise and allows high speed multi-colour operation without the need for special dye fixation treatments, a number of different ink-jet printing systems are currently being intensively investigated.

Inks for any of various types of ink-jet printing systems need to meet the following criteria:

(1) Physical properties of the ink, such as viscosity and surface tension, are each within a defined range.
(2) All solutes have good solubility in the ink medium to give solutions having good stability which do not plug the fine ejecting orifices (hereinafter referred to as "solution stability").
(3) The recording agent gives images of sufficient optical density.
(4) The ink does not change in physical properties or deposit solid matter during storage.
(5) Printing can be performed without a restriction on the nature of substrate on which a record is made.
(6) The ink exhibits a high rate of fixation.
(7) The ink gives images of good resolution and having good resistance to water, solvent (particularly alcohol), light, weather and abrasion.

However, images produced by conventional inks particularly by water-based inks, tend to form blots, dislocations or scratches, or to fade by water adhesion, mechanical friction, or exposure to light and an ink free from these drawbacks is an urgent requirement.

In addition to the above criteria, inks for use in an ink jet printing process using heat energy, must also have excellent heat stability. The ink, if thermally unstable, is liable to undergo chemical change because it is exposed to a high temperature during repetition of the generation and extinction of bubbles by heating, with the result that insoluble matter forms and deposits on the wall of the heating zone of the recording head, which, in turn, renders the recording head to be eventually incapable of discharging the liquid therethrough. Accordingly, the thermal stability of the ink is very important for continuous high-speed recording over a long period of time.

Although a number of inks have been proposed to overcome these problems, none have been produced which meet all the foregoing requirements.

According to a second feature of the present invention there is provided an ink comprising a water-soluble dye of Formula I.

It is possible, by use of a dye of Formula I to obtain an ink having an improved solution stability, particularly during a prolonged storage in concentrated form, and having excellent recording properties, particularly ejection stability, ejection responsiveness, and continuous recording workability.

The present ink is of practical importance and gives images having good water resistance, alcohol resistance and light resistance.

The present ink preferably comprises the dye of Formula I and a liquid medium, such as water, an organic solvent or a mixture thereof. The dye of the first feature of the present invention has especially good solution stability in the above-mentioned liquid media, thereby improving the ejection stability of the ink and reducing the incidence of plugging of the ejecting orifice even after a long period of storage in the recording apparatus.

The amount of the dye in the ink is determined in accordance with the desired optical density of the image, the type of recording device to be used, other components to be added, the required physical properties of ink, etc. But generally speaking, a suitable dye content is in the range of 0.5–20%, preferably 0.5–15%, and especially 1–10%, by weight based on the total weight of the ink.

The present ink can contain, besides the dye of Formula I, other dyes selected from various types of known dyes such as direct dyes, acid dyes, and the like but preferably contains only a dye of Formula I or such a dye and dyes having similar performance characteristics in ink jet printing.

Liquid media used for preparing the present ink include water and mixtures of water with various water-soluble organic solvents. The water-soluble organic solvents include $C_1$–$C_4$ alkanols such as methanol, ethanol, n-propanol, isopropanol, n-butanol, sec-butanol, tert-butanol, isobutanol; amides such as dimethylformamide and dimethylacetamide; ketones or ketone alcohols such as acetone and diacetone alcohol; ethers such as tetrahydrofuran and dioxane; nitrogen-containing heterocyclic ketones such as N-methyl-2-pyrrolidone and 1,3-dimethyl-2-imidazol-idinone; polyalkylene glycols such as polyethylene glycol and polypropylene glycol; alkylene glycols and thioglycols containing $C_2$–$C_6$ alkylene groups such as ethylene glycol, propylene glycol, butylene glycol, triethylene glycol; thiodiglycol, hexylene glycol, and diethylene glycol; other polyols such as glycerol, 1,2,6-hexanetriol; and lower alkyl ethers of polyhydric alcohols such as 2-methoxyethanol, 2-(2-methoxyethoxy)ethanol, 2-(2-ethoxyethoxy)ethanol and 2-[2-(2-methoxyethoxy)ethoxy]ethanol, 2-[2-(2-ethoxyethoxy)ethoxy]-ethanol.

Preferred water-soluble organic solvents among these are glycols and glycol ethers, such as ethylene glycol, diethylene glycol, triethylene glycol and 2-methoxy-2-ethoxy-2-ethoxyethanol; polyethylene glycols with molecular weights up to 500; and heterocyclic ketones such as N-methylpyrrolidone and 1,3-dimethyl-2-imidazolidione. Preferred specific solvent mixtures are a binary mixture of water and diethylene glycol and a tertiary mixture of water, diethylene glycol and N-methyl-pyrrolidone.

The present ink preferably contains in from 5–95%, preferably 10–80%, and especially 20–50%, by weight of the water soluble organic solvent based on the total weight of the ink.

The present ink, prepared from the components mentioned above, is generally characterised by excellent and balanced recording performance characteristics i.e. signal responsiveness, stability for producing droplets, ejection stability, long-term continuous recording workability, and ejection stability after a long rest. It also generally exhibits good preservation stability, solution stability, fixation on the recording substrate and resistance of the recorded image to water, alcohol, light and weather. However, miscellaneous known additives may also be incorporated into the present ink for further improvement of these characteristics. Examples of suitable additives are viscosity modifiers, such as poly(vinyl alcohol), cellulose derivatives, and other water-soluble resins; various kinds of surfactants, i.e. cationic, anionic, and nonionic; surface tension modifiers, such as diethanolamine and triethanolamine; and pH conditioners, such as buffers.

Inks for use in ink-jet recording of the type based on the application of a charge to the ink droplets usually contain an inorganic salt, such as lithium chloride, ammonium chloride or sodium chloride as a resistivity modifier. Urea or thiourea may also be added to improve the water-retentivity of the ink at the tip of the ejecting orifice. When the present ink is used for ink-jet recording of the type based on the action of thermal energy, the thermal properties, e.g. specific heat, coefficient of thermal expansion, and heat conductivity, of the ink may be modified by suitable additives.

If the present ink is to be applied by means of a writing tool, e.g. a pen, it may be necessary to modify the viscosity and the other physical properties in relation to the affinity of the ink for the recording substrate.

The present ink represents a significant step towards satisfying all the requirements stated above, that is to say, to providing an ink which does not plug capillary tubes or ejecting orifices, does not result in deterioration or formation of precipitate during storage, is excellent in recording workability, particularly ejection ability and ejection responsiveness; and gives such good quality images as to be excellent in colour density, shade, and contrast and have good resistance to water, solvent, light weather, and abrasion and excellent fixing properties.

Furthermore, certain preferred classes of the present inks are particularly suitable for use in an ink jet recording process utilising thermal energy because of their good long term heat stability.

The present invention in so far as it relates to inks is further illustrated with reference to the following Examples in which all parts and percentages are by weight unless otherwise indicated.

EXAMPLE 11

Inks were prepared, using the Dyes 1 to 10, as described in Examples 1 to 10 above, in accordance with the following recipe:

| Dye | 5 parts |
|---|---|
| Diethylene glycol | 35 parts |
| Deionised water | 60 parts |

The above-mentioned inks were prepared by thorough mixing of the ingredients, filtering the solution under pressure through a Teflon filter (pore size: 1 micron) and degassing the filtered ink, in vacuo. For each of the inks the following five characteristics, $T_1$–$T_5$, were measured using a recording apparatus having an on-demand type of recording head (50u-diameter ejecting orifice, piezooscillator driving voltage 60 V, frequency 4 KHz). Each ink gave good results in each test.

$T_1$—Prolonged Storage Stability

Each ink was sealed separately in a glass container and stored at $-30°$ C. and $60°$ C. for 6 months. In each case there was no appreciable separation of any insoluble matter or any change in physical properties and colour.

$T_2$—Ejection Stability

Each ink was subjected to continuous recording tests at room temperature, $5°$ C., and $40°$ C. for 24 hours. Each ink gave high quality images constantly throughout the test period at each temperature.

$T_3$—Ejection Responsiveness

Each ink was subjected to intermittent ejection at two-second intervals and ejection after standing for two months and each ink showed stable uniform recording without causing plugging of the orifice.

T₄—Quality of Recorded Image

Images recorded on the following three types of recording paper were of high optical density and sharp and clear in all cases. Each image, after exposure to ambient light in a room for three months, showed a reduction in optical density not greater than 1%. Results of immersing the recorded papers in water for one minute showed a very little blotting of the images.

| Paper | Supplier |
| --- | --- |
| IJ recording paper type S | Mitsubishi Paper Mills Ltd. |
| IJ recording paper type M | Mitsubishi Paper Mills Ltd. |
| IJ recording paper type L | Mitsubishi Paper Mills Ltd. |

T₅—Fixing Properties for Recording Member

Images recorded on the above-mentioned three types of recording paper were rubbed with a finger 15 seconds after recording, and without forming any smudges or blots, indicating the excellent fixation properties of the images.

EXAMPLE 12

An element for transforming electric energy into thermal energy was prepared on an alumina substrate as follows.

A SiO₂ (lower) layer 5 microns thick was formed over the alumina substrate by sputtering and a 1000 Å HfB₂ layer, as a heat generating resistor layer, and a 3000 Å aluminum layer, as an electrode, were successively laid thereover. A heat generating resistor pattern having size of 50×200 microns was formed by selective etching of the aluminum layer. A SiO₂ layer 3500 Å thick, as a protective (upper) layer, was then laid thereover. A print head was formed by bonding a glass plate on which grooves 50 microns wide and 50 microns deep had been engraved onto the SiO₂ protective layer in register with the etched pattern on the heat generating resistor. The tip surface of orifice was then polished so that the distance between the tip of heat generating resistor and the tip surface of orifice was 250 microns.

The print head was operated by applying printing signals of $40\ V \times 10^{-5}$ sec rectangular voltage pulses at a cycle of $2 \times 10^{-4}$ sec. The print head operated normally and without blockage for 160 hours using an ink having the following composition:

| | |
| --- | --- |
| Dye 1 (decomp'n temp: 280° C.) | 5 parts |
| Diethylene glycol | 25 parts |
| N—methyl-2-pyrrolidone | 20 parts |
| Water | 50 parts |

In a comparative test the print head operated satisfactorily for only 10 hours, under the same conditions as above, using an ink having the same composition as the above ink except for the replacement of Dye 1 with a dye of the formula:

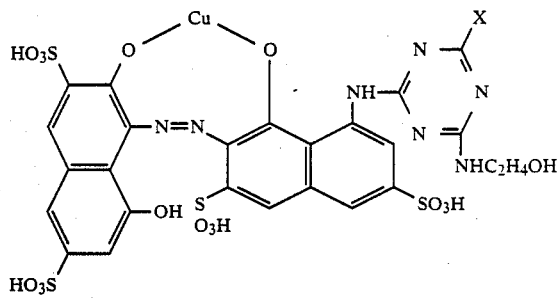

wherein X is 4-(4,8-disulphonaphth-2-ylazo)-phenylimino.

EXAMPLE 13

The print head was operated similarly to Example 12 using inks having the composition described in Example 12 except for the replacement of Dye 1 by the dyes and amounts indicated in Table 1, by applying printing signals of $50\ V \times 10^{-5}$ sec rectangular voltage pulses at a cycle of $2 \times 10^{-4}$ sec. The resulting satisfactory operating periods are shown in Table 1.

TABLE 1

| Composition of ink | | Satisfactory |
| --- | --- | --- |
| Dye No. | Content (wt %) | Operating Period (hours) |
| 1 | 5 | 180 |
| 1 | 6 | 150 |
| 2 | 5 | 170 |
| 2 | 6 | 160 |
| 2 | 7 | 120 |
| 3 | 5 | 150 |
| 3 | 6 | 130 |
| 4 | 5 | 120 |
| 5 | 7 | 120 |

EXAMPLES 14–26

Inks having the compositions defined in Table 2 were prepared and tested for properties T₁–T₅, in the same manner as in Example 11.

The results indicated that all these inks have good characteristics, and particularly excellent recording performance, fixation properties and sharpness of image.

TABLE 2

| Example No. | Dye No. (parts) | Liquid medium and other components (parts) |
| --- | --- | --- |
| 14 | 1 (3) | Water (62) |
| | | Ethylene glycol (39) |
| | | 1,2,6-hexanetriol (5) |
| 15 | 2 (4) | Water (61) |
| | | Glycerol (25) |
| | | Triethanolamine (10) |
| 16 | 3 (3) | Water (67) |
| | | Diethylene glycol (30) |
| | | Methyl p-hydroxybenzoate (0.1) |
| 17 | 4 (2) | Water (68) |
| | | Triethylene glycol monomethyl ether (30) |
| | | Polyoxyethylene nonylphenol ether (0.1) |
| 18 | 5 (3) | Water (72) |
| | | Propylene glycol (20) |
| | | Dimethylformamide (5) |
| 19 | 1 (3) | Water (57) |
| | | Ethyl alcohol (10) |
| | | Glycerol (30) |
| | | Sodium dehydroacetate (0.1) |

TABLE 2-continued

| Example No. | Dye No. (parts) | Liquid medium and other components (parts) |
|---|---|---|
| 20 | 2 (5) | Water (55)<br>Ethylene glycol (35)<br>1,2,6-Hexanetriol (5) |
| 21 | 3 (4) | Water (41)<br>Triethylene glycol (30)<br>Triethylene glycol monomethyl ether (25) |
| 22 | 4 (2) | Water (73)<br>Glycerol (20)<br>Triethanolamine (5) |
| 23 | 5 (3) | Water (57)<br>Triethylene glycol (35)<br>Thiodiglycol (5) |
| 24 | 1 (3) | Water (76)<br>Ethylene glycol (29)<br>Lithium chloride (1) |
| 25 | 2 (7) | Water (63)<br>Triethylene glycol monomethyl ether (20)<br>Glycerol (10) |
| 26 | 2 (1) | Water (64)<br>Ethylene glycol (30)<br>Polyethylene glycol #200 (5) |

EXAMPLE 27

The inks prepared in Examples 11 and 13 to 26 were charged separately into commercial fountain pens and records were made on plain paper. The results showed no blotting of image and high rates of absorption of recording liquid in all the cases.

We claim:

1. An ink comprising a water-soluble dye, free from cellulose reactive groups, of the formula:

$$\left[ \begin{array}{c} \text{(structure with groups G, D, A, E, F, labeled with } (L)_q, \text{O, N=N, NH, N, NR}^1\text{R}^2, \text{MO}_3\text{S, SO}_3\text{M, X)} \end{array} \right]_p$$

wherein
$R^1$ is $-(C_aH_{2a}O)_m(C_bH_{2b}O)_nH$,
$R^2$ is H or $-(C_aH_{2a}O)_m(C_bH_{2b}O)_nH$, or
$R^1$ and $R^2$ together with the nitrogen atom form a morpholine ring
a and b are different and from 1 to 8
m is from 1 to 10;
n is from 0 to 9;
q is ½ or 1
p is 1 or 2
L is a transition metal capable of complexing with a dye
M is H, ammonium, or a monovalent metal;
D is a substituted azo group;
E is nitro, $C_{1-4}$-alkyl, $C_{1-4}$-alkoxy, halogen, or sulphonate;
G and F are H;
X is $NR^1R^2$, $NR^3R^4$, $-NR^3-Z-NR^4-$, $OR^3$, or the residue of a mono- or dis-azo chromophore comprising benzene, naphthalene or hetero-mono- or bi-cyclic diazo and coupling components, linked to the triazine nucleus through a primary or secondary amino linking group in which $R^3$ and $R^4$ are each independently H, alkyl or aryl; and
Z is a divalent linking group.

2. An ink comprising a dye in accordance with claim 1, suitable for a recording system of the type in which an ink is ejected from a small orifice in the form of droplets directed towards a substrate on which an image is to be formed.

3. An ink according to claim 1 wherein the dye is dissolved in water or a water-soluble organic solvent.

4. An ink according to claim 3 wherein the water-soluble organic solvent is a polyhydric alcohol.

5. An ink according to claim 3 containing from 0.5% to 20% by weight of the dye.

6. A method of printing which comprises ejecting an ink in accordance with claim 1, from a small orifice in the form of droplets directed towards a substrate on which an image is to be formed.

7. An ink according to claim 1 wherein the dye $NR^1R^2$ is selected from hydroxyethylamino, di(hydroxyethyl)amino and morpholino.

8. An ink according to claim 1 wherein the dye, X is $NR^1R^2$.

9. An ink according to claim 1 wherein the dye, X is $NR^3R^4$ or $OR^2$ and $R^3$ is selected from H and $C_{1-4}$-alkyl and $R^4$ is selected from the group consisting of H, $C_{1-4}$-alkyl, phenyl or naphthyl in which the phenyl and naphtyl are unsubstituted or substituted by one or more groups selected from the group consisting of $C_{1-4}$-alkyl, $C_{1-4}$-alkoxy, $C_{1-4}$-alkylcarbonylamino, unsubstituted and mono- and di-alkyl-amino-sulphonyl and carbonyl, nitro, halogen, mono and di-$C_{1-4}$-alkylamino, hydroxy, phenylamino, carboxylate and sulphonate.

10. An ink according to claim 9 wherein the dye, X is the residue of a mono- or dis-azo chromophore comprising benzene or naphthalene diazo and coupling components, optionally carrying one or more substituents selected from the substituents defined for $R^4$.

11. An ink according to claim 9 wherein the dye, X is $-NR^3-Z-NR^4-$ wherein $R^3$ and $R^4$ are selected from the group consisting of H, $C_{1-4}$-alkyl, phenyl and phenyl substituted by one or more of the substituents defined for $R^4$ and Z is selected from the group consisting of optionally substituted or optionally interrupted $C_{1-6}$-alkylene, phenylene, biphenylene, 4-($C_{1-4}$-alkylene)phen-1-yl in which the substituents are selected from the substituents defined for $R^4$ and the interrupting atoms are selected from the group consisting of oxygen, nitrogen and sulphur or Z is a divalent residue of a mono or bisazo or a stilbene chromophore.

12. An ink according to claim 1 wherein the dye D is a phenylazo or naphthylazo group carrying at least one sulphonate group, $SO_3M$, and optionally carrying one or more groups selected from the group consisting of $C_{1-4}$-alkyl, $C_{1-4}$ alkoxy, $C_{1-4}$alkylcarbonylamino, unsubstituted and mono- and di-alkylamino-sulphonyl and carbonyl, mono- and di-$C_{1-4}$-alkylamino phenylamino, nitro, halogen, carboxylate, sulphonate and hydroxy.

13. An ink according to claim 1, wherein the dye carries at least four sulphonate groups.

14. An ink according to claim 1 wherein $R^1$ is hydroxyethyl, $R^2$ is H, $p=1$, L is copper, $q=1$, M is potassium, G and F are H, D is 2,5-disulphophenylazo, E is methyl and X is 5-hydroxy-6-(2-sulphophenylazo)-7-sulphonaphth-2-ylimino, as potassium salt.

* * * * *